United States Patent [19]

Mazakas

[11] Patent Number: 5,171,368
[45] Date of Patent: Dec. 15, 1992

[54] FILTER BELT ASSEMBLY FOR A POWDER SPRAY BOOTH

[76] Inventor: Russell Mazakas, 1691 Solano, Ontario, Calif. 91764

[21] Appl. No.: 724,714

[22] Filed: Jul. 2, 1991

[51] Int. Cl.⁵ .................. B05B 15/12; B05C 15/00
[52] U.S. Cl. .................. 118/70; 118/309; 118/326; 55/DIG. 46; 55/354; 210/400
[58] Field of Search ........... 118/309, 70, 312, 326, 118/634, DIG. 7; 55/290, 354, DIG. 46; 210/400; 454/50

[56] References Cited

U.S. PATENT DOCUMENTS

| | | | |
|---|---|---|---|
| 2,319,353 | 5/1943 | Schwartz et al. | 118/309 |
| 3,918,641 | 11/1975 | Lehmann et al. | 118/621 |
| 4,009,681 | 3/1977 | Heckman et al. | 118/70 |
| 4,153,008 | 5/1979 | Marino | 118/634 |
| 4,257,345 | 3/1980 | Brice | 118/634 |
| 4,277,260 | 7/1981 | Browning | 55/273 |
| 4,378,728 | 4/1983 | Berkmann | 55/310 |
| 4,394,146 | 7/1983 | Klein | 55/354 |
| 4,405,342 | 9/1983 | Bergman | 55/354 |

*Primary Examiner*—W. Gary Jones
*Assistant Examiner*—Charles K. Friedman
*Attorney, Agent, or Firm*—Blakely, Sokoloff, Taylor & Zafman

[57] ABSTRACT

A filter belt assembly located at the bottom of the inner cavity of a spray booth. The filter assembly has a plurality of first sprockets each spaced apart a predetermined distance along a horizontal axis and a plurality of second sprockets each spaced apart a predetermined distance along a horizontal axis. The second sprockets are spaced a predetermined distance from the first sprockets along a vertical axis, wherein each second sprocket is interposed between two adjacent first sprockets such that the sprockets guide a filter belt through the bottom of the inner cavity in a serpentine fashion. The filter assembly has a drive means to move the filter belt and a vacuum unit to remove excess paint powder that is disposed on the belt, as the belt moves from the booth to the vacuum. The filter belt may also have an air blower located under the filter belt where the belt vacuum is located. The air blower helps to dislodge and loosen the excess powder on the filter belt to facilitate removal, and increase the recovery efficiency of the vacuum.

17 Claims, 2 Drawing Sheets

FILTER BELT ASSEMBLY FOR A POWDER SPRAY BOOTH

FIELD OF THE INVENTION

This invention relates to spray booths used to coat workpieces with electrically charged resin powder.

BACKGROUND OF THE INVENTION

One Of the more important processes for applying coating materials to commercial products is the use of electrostatic resin coating techniques. Briefly, this technique involves spraying electrically charged powder paint particles to a workpiece which is at ground potential. The charged powder particles are attracted to the workpiece and form a uniform coating therearound which is subsequently fused by the application of heat to form a solid homogeneous coating.

In the electrostatic powder coating process, relatively large portions of the released electrostatically charged powder do not impinge upon the workpiece or do not have sufficient adherence thereto, because the desired layer thickness has already been attained on the workpiece which neutralizes the charge. The workpieces are generally sprayed within a spray booth which contains the toxic powder. The booth has openings that allow air to be drawn in, so that the excess powder does not drift out of the spray booth enclosure. This air is then exhausted out of the spray booth after having gone through a filter to remove the oversprayed powder from the air. It is desirable to filter out the excess powder and possibly reuse the resin to reapply onto new workpieces.

U.S. Pat. No. 3,918,641 issued to Lehmann discloses an installation in which the excess powder or overspray is continuously collected. The electrostatic powder coating installation depicted therein, consists of a spray booth that has a spray gun 17 that sprays electrostatically charged powder onto workpieces. The booth has an inner cavity that is bound by the first face of a filter belt 23 moving through the cavity. The filter belt moves between two roller drums located at either end of the spray booth. A vacuum 44 is located above the filter belt that removes the excess powder from the first face of the belt.

In this installation, the excess powder and exhaust air within the inner cavity are drawn to the filter belt under the influence of an air suction device. The filter belt has a predetermined permeability such that the air is purified of the excess powder as it is drawn through the filter belt, wherein the powder is collected on the surface of the filter belt and recovered by the vacuum for reapplication by the spray gun.

U.S. Pat. No. 4,257,345 issued to Brice discloses a similar installation as '641, but has the added feature of a second movable belt used to protect the filter belt from abrasive contact with a wire grate interposed between the belt and the rollers of the belt assembly.

U.S. Pat. No. 4,153,008 issued to Marino discloses a movable filter belt comprised of two layers, one which collects the excess powder and a second coarser layer to provide the first layer with support. Means are provided adjacent the powder cleaning device to separate the support layer from the filter layer whereby friction between the filter layer and the powder cleaning device is greatly reduced to extend the useful life of the movable belt.

Oversized parts generally require large openings to allow the parts to pass through the booths. To insure that the toxic powder does not drift out of the booth openings and into adjacent areas, the system requires a large amount of air to flow through the booth. It is not unusual for the booth to draw in over 12,000 cubic feet per minute (CFM) of air. Most filter belt media will only pass 50 CFM per square foot. Belts designed for larger air flow cannot prevent the fine powder from passing through the media. Thus a 12,000 CFM booth would require 240 square feet of filter area. A six foot wide flat filter belt would require a 40 foot long booth. A larger booth costs more to install, takes longer to clean and requires a lot of factory floor area. It would be desirable to have a filter belt assembly that improves the recovery efficiency of excess powder from the inner cavity of a spray booth in a shorter booth length.

SUMMARY OF THE INVENTION

The present invention is a filter belt assembly located at the bottom of the inner cavity of a spray booth. The filter assembly has a plurality of first sprockets each spaced apart a predetermined distance along a horizontal axis and a plurality of second sprockets each spaced apart a predetermined distance along a horizontal axis. The second sprockets are spaced a predetermined distance from the first sprockets along a vertical axis, wherein each second sprocket is interposed between two adjacent first sprockets such that the sprockets guide a filter belt through the bottom of the inner cavity in a serpentine fashion. The filter assembly has a drive means to move the filter belt. A vacuum unit removes excess paint powder that is deposited on the belt, as the belt moves from the booth and under the vacuum. The serpentine movement of the belt increases the amount of filter belt exposed to the inner cavity, increasing the belt area and air flow through the belt, without having to increase the shop room area required for the spray booth. By increasing the area of the filter belt in the inner cavity there is less powder per given area of filter belt at a given speed, preventing excessive powder buildup on the filter belt and thereby increasing the recovery efficiency of the cleaning vacuum. The increased belt area allows the filter belt to be rotated at a slower rate and still maintain an optimal level of powder collected per given area of filter belt. The slower rate provides more time for a given portion of filter belt to be treated by the vacuum, increasing the recovery efficiency of the overall assembly.

Furthermore an increased belt area would allow greater air flow across the filter belt, to accommodate a larger air flow from inside the booth. Typically the booths have a blower that draws the powder toward the belt. Because of the restrictive air flow limitations of flat belts of the prior art, increasing the air flow within the spray booth would require a longer booth to accommodate more filter belt area. By serpentining the belt and enlarging the belt area, the mass flow correspondingly increases so that the additional air flow insures that the excess toxic powder is filtered by the belt and does not escape the booth.

The filter belt may also have an air blower located under the filter belt where the belt vacuum is located. The air blower directs a stream of air through the belt toward the vacuum, wherein the blower helps dislodge and loosen the excess powder on the filter belt, to facilitate removal and increase the recovery efficiency of the vacuum.

Therefore it is an object of this invention to provide a filter belt with an increased powder recovery area that can be used within the dimensions of shorter spray booths.

It is also an object of this invention to provide a filter that will allow increased air flow within the inner cavity of a spray booth such that the powdered paint resin is directed toward the filter belt and does not escape the booth.

It is also an object of this invention to increase the powder recovery efficiency of a vacuum operatively connected to a filter belt that collects excess paint powder.

BRIEF DESCRIPTION OF THE DRAWINGS

The Object and advantages of the present invention will become more readily apparent after reviewing the following detailed description and accompanying drawings, wherein.

DETAILED DESCRIPTION OF THE INVENTION

Figure 1:
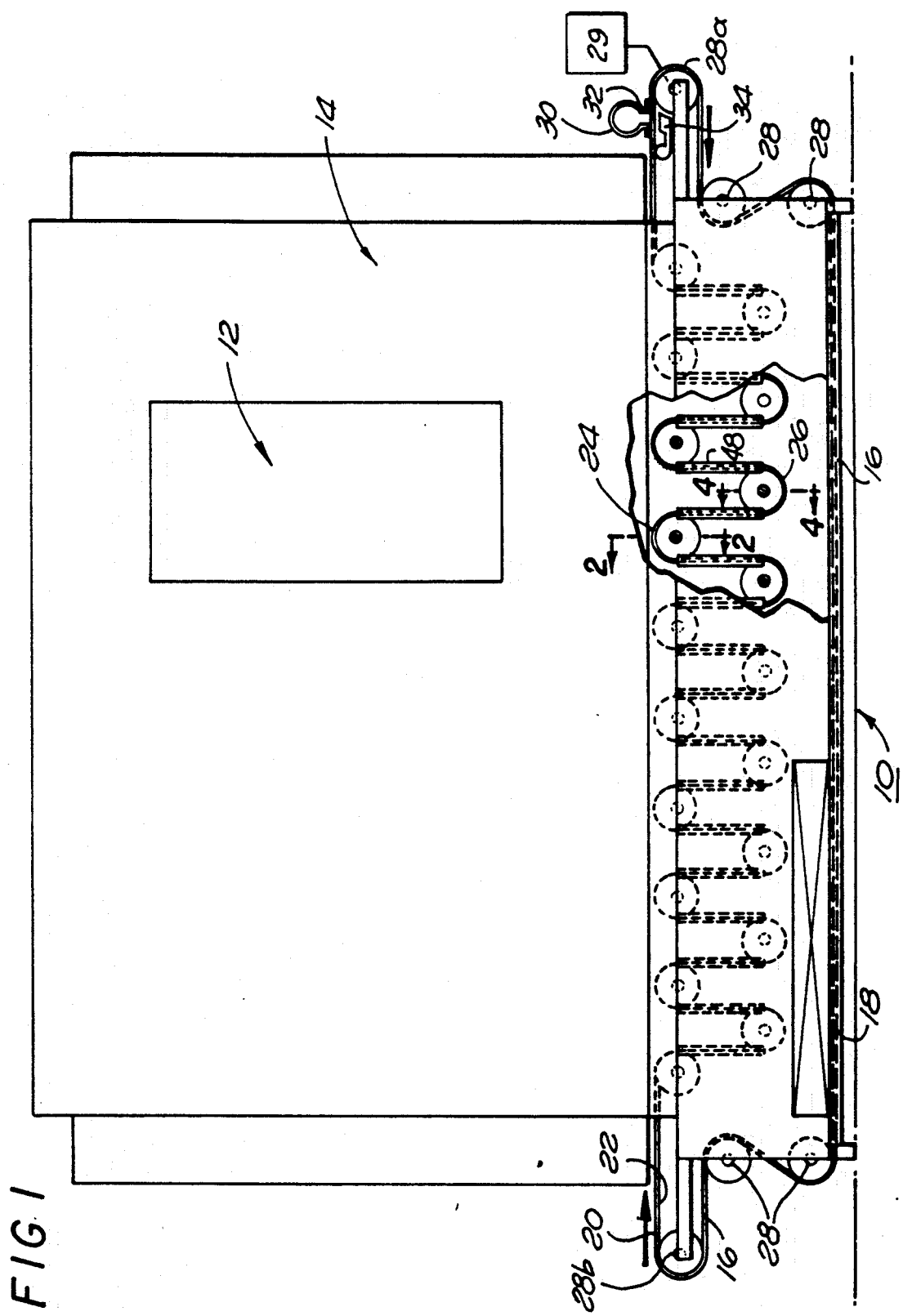
FIG. 1 is a side view of an electrostatic spray booth showing the filter belt assembly of the present invention located at the bottom of the inner cavity of the booth.

Referring to the drawings more particularly by reference numbers, number 10 is a filter belt assembly 10 located below the inner cavity 12 of a spray booth 14. The spray booth 14 contains workpieces that are sprayed with electrostatic paint powder from a spray gun that extends into the inner cavity 12 of the booth. Not all of the powder adheres to the workpieces, wherein the excess paint floats about the booth 12. Because the paint is expensive and toxic, it is desirable to contain and remove the residual powder to be used again by the spray gun. The assembly 10 includes a filter belt 16 that extends along the bottom of the inner cavity 12, having a predetermined width such that the belt 16 encloses the cavity and captures the excess paint powder. A first vacuum unit 18 can be incorporated into the assembly 10 to induce air flow toward the unit 10 and filter belt 16, such that the powder adheres to the belt 16 and not the walls of the booth 14. The booth 14 may also have a blower within the inner cavity to further induce an air flow toward the belt 16. The filter belt 16 has a first surface 20 facing the inner cavity 12 and a second surface 22. The belt 16 can be constructed from a single flexible sheet that is pervious to air but substantially impervious to the paint powder, such that the air flow created by the vacuum unit 18 can pass through the belt 16 without inducing paint penetration through the belt, wherein the powder is deposited onto the first surface 20 of the belt 16.

The assembly 10 has a plurality of first sprockets 24 spaced apart a predetermined distance along a horizontal axis, and a plurality of second sprockets 26 spaced apart a predetermined distance along a horizontal axis. The second sprockets 26 being spaced from the first sprockets 24 a predetermined distance along a vertical axis, wherein a second sprocket 26 is located between adjacent first sprockets 24. The sprockets are adapted to guide the filter belt 16 such that the belt moves in a serpentine fashion. The assembly can also have end sprockets 28 to allow the belt 16 to move in a loop, providing a continuous cycling of the belt. One of the end sprockets 28a can be attached to the output shaft of a motor 29, such that the drive sprocket 28a can provide a drive source for moving the belt 16. One or more of the other end sprockets 28b can be adapted to move relative to the other sprockets such that the tension of the belt 16 can be adjusted. The sprockets move the belt 16 through the inner cavity 12 in the direction indicated by the arrow in FIG. 1.

The paint powder is deposited onto the first surface 20 of the belt 16 and then removed by a second vacuum unit 30 typically located outside the spray booth 14. The second vacuum unit 30 has an opening 32 located adjacent the first belt surface 20, that removes the paint powder that was deposited on the belt, by inducing air flow from the belt 16 to the second vacuum 30. To insure that all of the powder is removed by the second vacuum unit 30, a blower 34 can be added to loosen the powder from the belt to help the vacuum 30 draw up the paint. The blower 34 directs a stream of air through the belt 16 toward the second vacuum 30. Because the belt 16 is pervious to air the blower 34 can separate the powder from the belt in much the same way that the first vacuum 18 induced the powder onto the belt. The blower 34 generally removes powder that is embedded within the belt 16. After the powder is removed, it can be separated, collected and used again by the spray gun.

The serpentine movement of the belt 16 provides more area that is exposed to the inner cavity 12, so that the belt can be driven at a slower rate without having an undesirable build-up of powder per unit area. The slower rate allows a given unit area of belt 16 to be exposed to the second vacuum 30 for a longer period of time, allowing the vacuum 30 and blower 34 to more thoroughly clean the first surface 20. The complete removal of the powder from the belt 16 could allow the same belt assembly 10 to be used for different paint colors. To insure that all the powder is removed from the belt 16 before a new color is used, the assembly 10 could continue to operate for a predetermined time after spraying is terminated, to allow the vacuum 30 and blower 34 to thoroughly clean the belt 16.

Figure 2:
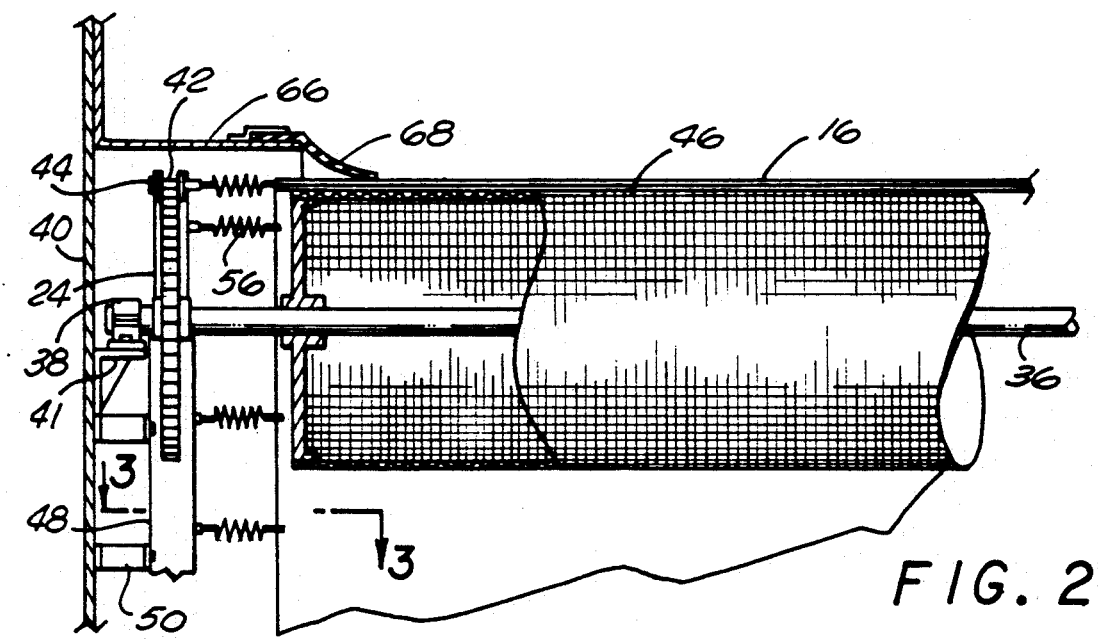
FIG. 2 is a sectional view, generally taken along line 2—2 of FIG. 1, showing a first sprocket, operating shaft and roller drum assembly that guides a filter belt.
Figure 4:
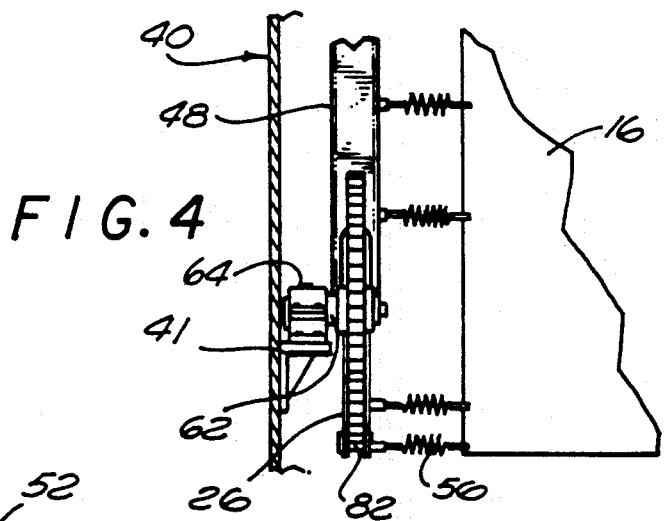
FIG. 4 is a sectional view, generally taken along line 3—3 of FIG. 1, showing a second sprocket and support shaft assembly that guides the filter belt.
Figure 3:
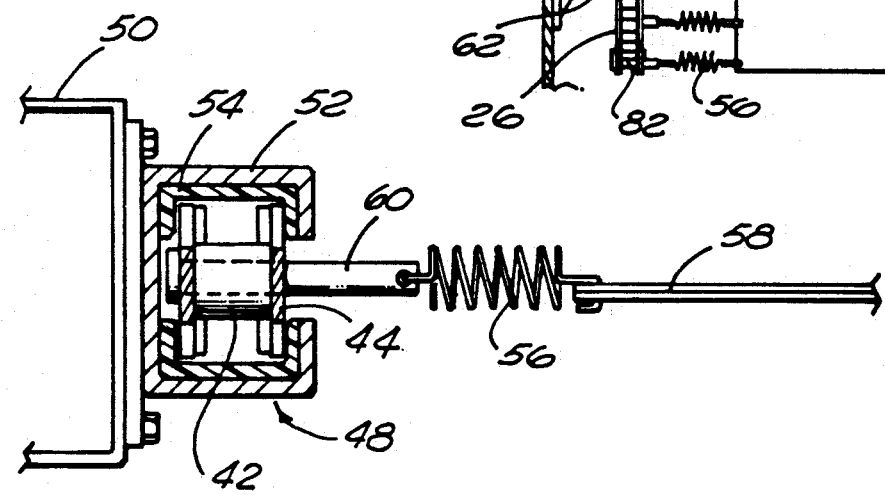
FIG. 3 is a sectional view, generally taken along line 3—3 of FIG. 2, showing the attachment of the filter belt to a chain that rides along a guide rail.

FIGS. 2, 3 and 4 more clearly show the attachment of the belt 16 to the sprockets. FIG. 2 shows a first sprocket 24 attached to one end of a shaft 36 that is journaled within a first bearing 38 attached to an assembly wall 40 by a bracket 41. The other end of the shaft 36 resides within another first bearing 38 located on an opposing assembly wall 40. It being preferable to attach another first sprocket 24 to the shaft 36 such that there is a pair of first sprockets 24, wherein the opposing side is a mirror image of the structure depicted in FIG. 2. The use of sprocket sets being particularly desirable for wide belts 16 such that both ends of the belt are guided by the sprockets. The belt 16 is attached to a chain 42 that has a length and shape corresponding to that of the belt. The links 44 of the chain 42 engage the sprocket 24 teeth, in the same manner that a bicycle chain interacts with the gears of a bike. The drive sprocket 28a moves the chain 42 which pulls along the belt 16 at a speed corresponding to the angular velocity of the drive sprocket 28a. The remaining sprockets 24, 26 and 28, support and guide the chain 42, as the belt 16 is moved along the serpentine loop configuration as shown in FIG. 1.

A roller 46 can be attached to the shaft 36 as shown, to support the belt 16 along the vertical axis. The roller 46 can be fabricated from a perforated material such as a screen mesh, which will allow air to flow through the roller 46, thereby increasing the overall airflow through the belt. The roller 46 also increases the amount of horizontal belt area as well as decreasing bending stresses on the belt 16. To keep the chain 42 and belt 16 aligned with the sprockets and to further protect the chain 42, a plurality of guide rails 48 can be attached to the assembly wall 40 by brackets 50 to guide the chain 42 between each first 24 and second 26 sprocket. As shown in FIG. 3, the rails 48 have a "C" shaped housing 52 that prevents lateral movement of the chain 42. A pair of "soft" pads 54 can be attached to each housing 52 to reduce friction forces between the chain 42 and housing 52, increasing the life of the chain 42 and reducing the output requirements of the drive motor when guide rails 48 are used. FIG. 3 more clearly shows a preferred means of attaching the belt 16 to the chain 42, wherein a spring 56 is interposed between a belt loop 58 and a chain shaft 60 that is connected to each belt link 44. The spring 56 provides a flexible means of belt attachment, such that the belt 16 is allowed to move relative to the chain 42. FIG. 4 shows a second sprocket 26 that is attached to a second shaft 62 that is journaled within a second bearing 64 attached to the assembly wall 40 by a bracket 41. The second sprocket 26 engages the chain 42 and guides the belt 16 in the same manner as the first sprocket 24. It is preferable to construct the second sprocket 26 without a roller 46 and accompanying shaft 36 to maximize the amount of belt area exposed to the inner cavity 12 of the booth. Each second sprocket 26 may have a corresponding second sprocket 26 such that there are second sprocket sets, wherein each opposing second sprocket 26 rotates independently of each other. The sprockets may be covered by a dust cover 66 that has a flexible flap 68 attached, that prevents the powdered paint from entering the sprocket area.

It is preferable that the first vacuum unit 18 be located below the sprockets but above the return loop of the filter belt 16, to insure that the vacuum 18 pulls the paint down to the belt 16 without causing the return portion of the belt 16 to bend toward the unit 18.

While certain exemplary embodiments of this invention have been described and shown in the accompanying drawings, it is to be understood that such embodiments are merely illustrative of and not restrictive on the broad invention, and that this invention not be limited to the specific constructions or arrangements shown and described, since various other modifications may become apparent to persons having ordinary skill in the art.

What is claimed is:

1. A powder collection system used in a powder spray booth, the powder spray booth having walls that define an inner cavity constructed to allow workpieces to be sprayed with powdered paint, comprising:
   a plurality of first sprockets located below the inner cavity of the spray booth, each said first sprocket being spaced apart a predetermined distance along a horizontal axis; a plurality of second sprockets located below the inner cavity of the spray booth, each said second sprocket being spaced apart a predetermined distance along a horizontal axis and a predetermined distance from said first sprockets along a vertical axis, each said second sprocket being interposed between two adjacent first sprockets such that said first and second sprockets are alternating along a horizontal plane;
   a filter belt operatively connected by means to said first and second sprockets, said filter belt being adapted to move in conjunction with the rotation of said first and second sprockets, said filter belt extending from each said first sprocket to an adjacent said second sprocket such that said filter belt can move through said first and second sprockets in a serpentine fashion, said filter belt having a first surface facing the inner cavity and being of a predetermined porosity such that said filter belt is pervious to air and essentially impervious to the powdered paint, said filter belt being constructed as a closed loop such that said filter belt travels in a repeatable path;
   air flow means for creating an air flow from the inner cavity through said filter belt such that the powdered paint is induced toward said filter belt and deposited on said first surface;
   drive means operatively connected to said filter belt for moving said filter belt about said first and second sprockets in said serpentine fashion; and
   vacuum means operatively connected to said filter belt for removing the powdered paint deposited on said first surface of said filter belt;
   whereby when said drive means moves said filter belt across the inner cavity in said serpentine fashion, the powdered paint is deposited on said first filter belt surface and transferred to said vacuum means which removes the powdered paint.

2. The system as recited in claim 1, further comprising a plurality of shafts, each shaft coupling one of said first sprockets to another corresponding first sprocket.

3. The system as recited in claim 2, further comprising a plurality of rollers attached to said shafts adapted to support said filter belt.

4. The system as recited in claim 1, wherein said air flow means is a first vacuum unit located a predetermined distance below said second sprockets, said first vacuum unit creating a differential pressure across said filter belt inducing said airflow from the inner cavity through said filter belt.

5. The system as recited in claim 1, wherein said vacuum means is a second vacuum unit operatively connected to said filter belt to remove the powdered paint from said first surface of said filter belt by inducing a flow of air from said filter belt to said second vacuum unit.

6. The system as recited in claim 1, wherein said filter belt connection means comprises a chain having a plurality of chain links adapted to engage said first and second sprockets and means for attaching said chain to said filter belt, wherein said chain and filter belt move in conjunction with the rotation of said first and second sprockets.

7. The system as recited in claim 6, wherein said chain attachment means is a plurality of springs, each said spring being attached to the end of said filter belt and a corresponding chain link.

8. The system as recited in claim 6, further comprising a plurality of guide rails attached to said assembly wall between each adjacent first and second sprocket, said guide rails being constructed to prevent said chain from moving along a horizontal axis such that said chain is aligned with said sprockets.

9. The system as recited in claim 1, further comprising a plurality of end sprockets operatively connected to said first and second sprockets such that said filter belt has a return loop, wherein said filter belt is constructed from a single sheet that is constantly moved about said sprockets.

10. The system as recited in claim 9, wherein one of said end sprockets is a drive sprocket operatively connected to a drive motor, said drive sprocket being operatively connected to said filter belt such that when said drive sprocket is rotated by said drive motor said filter belt is moved, wherein the movement of said filter belt rotates said first and second sprockets, whereby said first and second sprockets guide said filter belt to move in said serpentine fashion.

11. The system as recited in claim 10, wherein said filter belt connection means comprises a chain having a plurality of chain links adapted to engage said first, second and end sprockets and means for attaching said chain to said filter belt, such that when said end drive sprocket is rotated by said drive motor said chain and said filter belt are moved, wherein said movement of said chain rotates said first and second sprockets, whereby said first and second sprockets guide said filter belt to move in said serpentine fashion.

12. The system as recited in claim 10, wherein an end sprocket is adjustable such that the tension of said filter belt can be varied.

13. A powder collection system used in a powder spray booth, the powder spray booth having walls that define an inner cavity constructed to allow workpieces to be sprayed with powdered paint, comprising:
a plurality of first sprockets located below the inner cavity of the spray booth, each said first sprocket being spaced apart a predetermined distance along a horizontal axis;
a plurality of second sprockets located below the inner cavity of the spray booth, each said second sprocket being spaced apart a predetermined distance along a horizontal axis and a predetermined distance from said first sprockets along a vertical axis, each said second sprocket being interposed between two adjacent first sprockets such that said first and second sprockets are alternating along a horizontal plane;
a drive sprocket connected to a drive motor that rotates said drive sprocket;
a chain adapted to engage said first, second and drive sprockets such that when said drive sprocket is rotated by said drive motor said chain moves rotating said first and second sprockets;
a filter belt operatively connected to said chain, said filter belt being adapted to move in conjunction with the movement of said chain and the rotation of said first and second sprockets, said filter belt extending from each said first sprocket to an adjacent said second sprocket such that said filter belt can move through said first and second sprockets in a serpentine fashion, said filter belt having a first surface facing the inner cavity and being of a predetermined porosity such that said filter belt is pervious to air and essentially impervious to the powdered paint, said filter belt being constructed as a closed loop such that said filter belt travels in a repeatable path;
a first vacuum unit located a predetermined distance below said second sprockets to create an air flow from the inner cavity through said filter belt such that the powdered paint is induced toward said filter belt and deposited on said first surface; and
a second vacuum unit operatively connected to said filter belt that removes the powdered paint deposited on said first surface of said filter belt by inducing a flow of air from said filter belt to said second vacuum unit;
whereby when said drive motor rotates said drive sprocket and moves said chain, said first and second sprockets guide said filter belt across the inner cavity in said serpentine fashion, the powdered paint is deposited on said first filter belt surface and transferred to said second vacuum unit which removes the powdered paint.

14. The system as recited in claim 13, further comprising a plurality of shafts, each shaft coupling one of said first sprockets to another corresponding first sprocket.

15. The system as recited in claim 14, further comprising a plurality of rollers attached to said shafts adapted to support said filter belt.

16. A powder collection system used in a powder spray booth, the powder spray booth having walls that define an inner cavity constructed to allow workpieces to be sprayed with powdered paint, comprising:
a plurality of first sprockets located below the inner cavity of the spray booth, each said first sprocket being spaced apart a predetermined distance along a horizontal axis;
a plurality of second sprockets located below the inner cavity of the spray booth, each said second sprocket being spaced apart a predetermined distance along a horizontal axis and a predetermined distance from said first sprockets along a vertical axis, each said second sprocket being interposed between two adjacent first sprockets such that said first and second sprockets are alternating along a horizontal plant;
a drive sprocket connected to a drive motor that rotates said drive sprocket;
a chain adapted to engage said first, second and drive sprockets such that when said drive sprocket is rotated by said drive motor said chain moves rotating said first and second sprockets;
a filter belt operatively connected to said chain, said filter belt being adapted to move in conjunction with the movement of said chain and the rotation of said first and second sprockets, said filter belt extending from each said first sprocket to an adjacent said second sprocket such that said filter belt can move through said first and second sprockets in a serpentine fashion, said filter belt having a first surface facing the inner cavity and being of a predetermined porosity such that said filter belt is pervious to air and essentially impervious to the powdered paint, said filter belt being constructed as a closed loop such that said filter belt travels in a repeatable path;
a first vacuum unit means located a predetermined distance below said second sprockets to create an air flow from the inner cavity through said filter belt such that the powdered paint is induced toward said filter belt and deposited on said first surface;
a second vacuum unit operatively connected to said filter belt that removes the powdered paint deposited on said first surface of said filter belt by inducing a flow of air form said filter belt to said second vacuum unit; and a blower operatively coupled to said first vacuum unit to blow a stream of air through said filter belt toward said first vacuum unit, said blower further inducing said flow of air from said filter belt to said first vacuum unit to further remove the powdered paint from said first surface;

whereby when said drive motor rotates said drive sprocket and moves said chain, said first and second sprockets guide said filter belt across the inner cavity in said serpentine fashion, the powdered paint is deposited on said first filter belt surface and transferred to said second vacuum unit and blower which removes the powdered paint.

17. The system as recited in claim 16, further comprising a plurality of shafts, each coupling one of said first sprockets to another corresponding first sprocket.

* * * * *

UNITED STATES PATENT AND TRADEMARK OFFICE
CERTIFICATE OF CORRECTION

PATENT NO. : 5,171,368
DATED : December 15, 1992
INVENTOR(S) : Mazakas

It is certified that error appears in the above-identified patent and that said Letters Patent is hereby corrected as shown below:

Item [57],

In the Abstract at the 14th line change "disposed" to --deposited--.

In column 1 at line 11 change "Of" to --of--.

In column 3 at line 16 change "Object" to --object--.

In column 8 at line 36 change "plant" to --plane--.

In column 8 at line 67 change "form" to --from--.

Signed and Sealed this

Sixth Day of June, 1995

*Attest:*

BRUCE LEHMAN

*Attesting Officer*    *Commissioner of Patents and Trademarks*